(12) United States Patent
Shuster et al.

(10) Patent No.: US 10,684,839 B2
(45) Date of Patent: Jun. 16, 2020

(54) PLUGIN FOR SOFTWARE DEPLOYMENT

(71) Applicant: Red Hat Israel, Ltd., Raanana (IL)

(72) Inventors: Boaz Shuster, Kfar Saba (IL); Oded Ramraz, Ashdod (IL)

(73) Assignee: Red Hat Israel, Ltd., Raanan (IL)

( * ) Notice: Subject to any disclaimer, the term of this patent is extended or adjusted under 35 U.S.C. 154(b) by 38 days.

(21) Appl. No.: 15/182,808

(22) Filed: Jun. 15, 2016

(65) Prior Publication Data
US 2017/0364342 A1 Dec. 21, 2017

(51) Int. Cl.
*G06F 8/61* (2018.01)
*H04L 29/08* (2006.01)
(Continued)

(52) U.S. Cl.
CPC .............. *G06F 8/61* (2013.01); *G06F 8/60* (2013.01); *G06F 9/44526* (2013.01); *G06F 9/453* (2018.02); *G06F 9/45512* (2013.01); *H04L 67/303* (2013.01); *H04L 67/34* (2013.01); *G06F 9/45558* (2013.01); *G06F 2009/45562* (2013.01); *H04L 67/02* (2013.01)

(58) Field of Classification Search
CPC . H04L 67/34; G06F 9/45558; G06F 3/04842; G06F 8/61
See application file for complete search history.

(56) References Cited

U.S. PATENT DOCUMENTS

| 8,291,079 | B1 | 10/2012 | Colton et al. |
| 8,972,975 | B1 * | 3/2015 | Rogers .............. G06F 8/61 717/154 |

(Continued)

FOREIGN PATENT DOCUMENTS

| CN | 103677845 A | 3/2014 |
| CN | 104301338 A | 1/2015 |

OTHER PUBLICATIONS

Rajendra Choudhary, "5 ways to Download a website for Offline viewing", Feb. 3, 2016, MoonkingHackersClub.com (Year: 2016).*
(Continued)

*Primary Examiner* — Wei Y Zhen
*Assistant Examiner* — Amir Soltanzadeh
(74) *Attorney, Agent, or Firm* — Kilpatrick Townsend & Stockton LLP (57) ABSTRACT

A plugin for a website browser can enable a user to deploy software onto a computing device quickly and easily. For example, the plugin can automatically detect that a user is visiting a website on which program code for a software application is shared or hosted. The website may be an open-source website, a program-code repository, or a program-code review platform. The plugin can automatically analyze the program code, an installation file provided with the program code, software and hardware characteristics of the specific computing device on which the software application is to be deployed, and other data to determine how to deploy the software application on the specific computing device. The plugin can then deploy the software application on the computing device in response to the user clicking a button, allowing for the software application to be easily deployed on the computing device with minimal user interaction or skill.

20 Claims, 4 Drawing Sheets

(51) Int. Cl.
  *G06F 9/455* (2018.01)
  *G06F 9/445* (2018.01)
  *G06F 9/451* (2018.01)
  *G06F 8/60* (2018.01)

(56) References Cited

U.S. PATENT DOCUMENTS

| | | | | |
|---|---|---|---|---|
| 2004/0003390 | A1* | 1/2004 | Canter | G06F 8/61 717/178 |
| 2007/0174424 | A1* | 7/2007 | Chen | G06F 9/44526 709/217 |
| 2009/0037337 | A1* | 2/2009 | Baitalmal | G06Q 99/00 705/59 |
| 2009/0320019 | A1* | 12/2009 | Ellington | G06F 8/71 717/177 |
| 2011/0191743 | A1 | 8/2011 | Cope et al. | |
| 2014/0040880 | A1* | 2/2014 | Brownlow | G06F 8/60 717/177 |
| 2015/0127717 | A1* | 5/2015 | Teibel | G06F 8/65 709/203 |
| 2015/0134965 | A1 | 5/2015 | Morenius et al. | |
| 2015/0163288 | A1* | 6/2015 | Maes | H04L 67/10 709/203 |
| 2015/0234645 | A1* | 8/2015 | Ramachandran | G06F 9/445 717/178 |
| 2015/0363180 | A1* | 12/2015 | Alberti | G06F 9/45558 717/177 |

OTHER PUBLICATIONS

"One-click deploy everything on Scalingo," 2015, http://blog.scalingo.com/post/135572211508/one-click-deploy-everything-on-scalingo.

"Creating a 'Deploy to Heroku' Button," 2016, https://devcenter.heroku.com/articles/heroku-button.

Baxter, R.J., "Deploying a MEAN application to Bluemix in one click," 2015, http://developer.ibm.com/bluemix/2015/09/02/mean-app-to-bluemix-in-one-click.

Keahey, K., "Nimbus: Open Source Infrastructure-as-a-Service Cloud Computing Software," 2009, University of Chicago Argonne National Laboratory, http://workspace.globus.org.

"Any good online deployment automation and management tool?," http://stackoverflow.com/questions/10318013/any-good-online-deployment-automation-and-management-tool.

Shipley, G., "Best practices for deploying your apps in the cloud," 2015, http://www.ibm.com/developerworks/cloud/library/cl-best-practices-deploying-apps-in-cloud/index.html.

"Cloud Forge Subversion and Git hosting," https://marketplace.openshift.com/services/cloudforge.html.

http://www.theverge.com/2016/3/22/11287450/chrome-app-launcher-being-removed-google.

* cited by examiner

PLUGIN FOR SOFTWARE DEPLOYMENT

TECHNICAL FIELD

The present disclosure relates generally to software installation. More specifically, but not by way of limitation, this disclosure relates to a plugin for deploying software on a computing device.

BACKGROUND

Software sharing has become increasingly popular. Various online communities, particularly open-source software communities, are devoted to freely sharing program code as software. Typically, such program code can be hosted or shared on websites, such as open-source websites, program-code repositories (e.g., Github), or program-code review platforms through which users can leave comments or reviews about the program code. Some users may review program code on these websites for training or educational purposes. For example, users may analyze program code on these websites to learn how to program themselves. Other users may wish to execute program code obtained from these websites to run the corresponding software.

DETAILED DESCRIPTION

Certain aspects and features of the present disclosure relate to a website-browser plugin that can automatically and easily deploy program code that is hosted on a website onto a computing device. For example, the website-browser plugin can be integrated with a website browser to add the deployment functionality to the website browser. Then, when a user visits the website hosting the program code using the website browser, the website-browser plugin can automatically analyze various features related to the program code and the computing device to determine how to deploy the program code on the computing device. The website-browser plugin can then deploy (e.g., install, configure, and execute) the program code on the computing device. In this manner, the program code can be quickly and easily deployed on the computing device with minimal user involvement.

As a particular example, the website-browser plugin can detect that the user is visiting a website for an open-source video player. In some examples, the website can serve as a program-code repository, such as Github, or a program-code review platform through which users can leave comments or reviews about the video player. The website can include a downloadable program-code file for installing and executing the video player. Based on detecting that the website is a particular type of website, such as program-code repository or a program-code review platform, or that the website includes the downloadable program-code file, the website-browser plugin can automatically integrate a button—e.g., a "one click deployment button"—into the website's content. For example, the website-browser plugin can automatically integrate the button into the website's content near the top of the webpage so that the button is easily locatable by the user. The website-browser plugin can also automatically analyze a readme file associated with the program code, a software or hardware characteristic of the user's computing device, or any combination of these to determine a series of steps for installing, configuring, and running the video player on the user's computing device. The plugin can detect that the user clicked the button and, in response, perform the series of steps to deploy the video player on the user's computing device.

Examples of the present disclosure can allow software to be deployed more simply and efficiently than downloading, installing, configuring, and executing program code for the software manually, which can often be complicated, difficult, and time consuming. For example, typically, a user may visit a website that is hosting program code for software that the user wishes to deploy. The user can open a readme file on the website to learn how to deploy the software properly. But the readme file may have dozens, if not hundreds, of pages of installation guidelines, configuration settings, version numbers, program features, and other information. To further complicate matters, the software may need to be deployed using different settings, dependencies (e.g., libraries or other software), or program-code versions depending on the features of the computing device (e.g., the operating system, software, hardware, etc.) on which the software is to be deployed. This combination of factors can make it challenging and time consuming for a user to deploy software by reading these readme files. Some program code may not be provided with a readme file at all, and the user may need to guess at the proper way to deploy the software. But certain examples of the present disclosure overcome these and other problems by automatically analyzing various factors to determine how to deploy the software, and then deploying the software, all with minimal user interaction.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
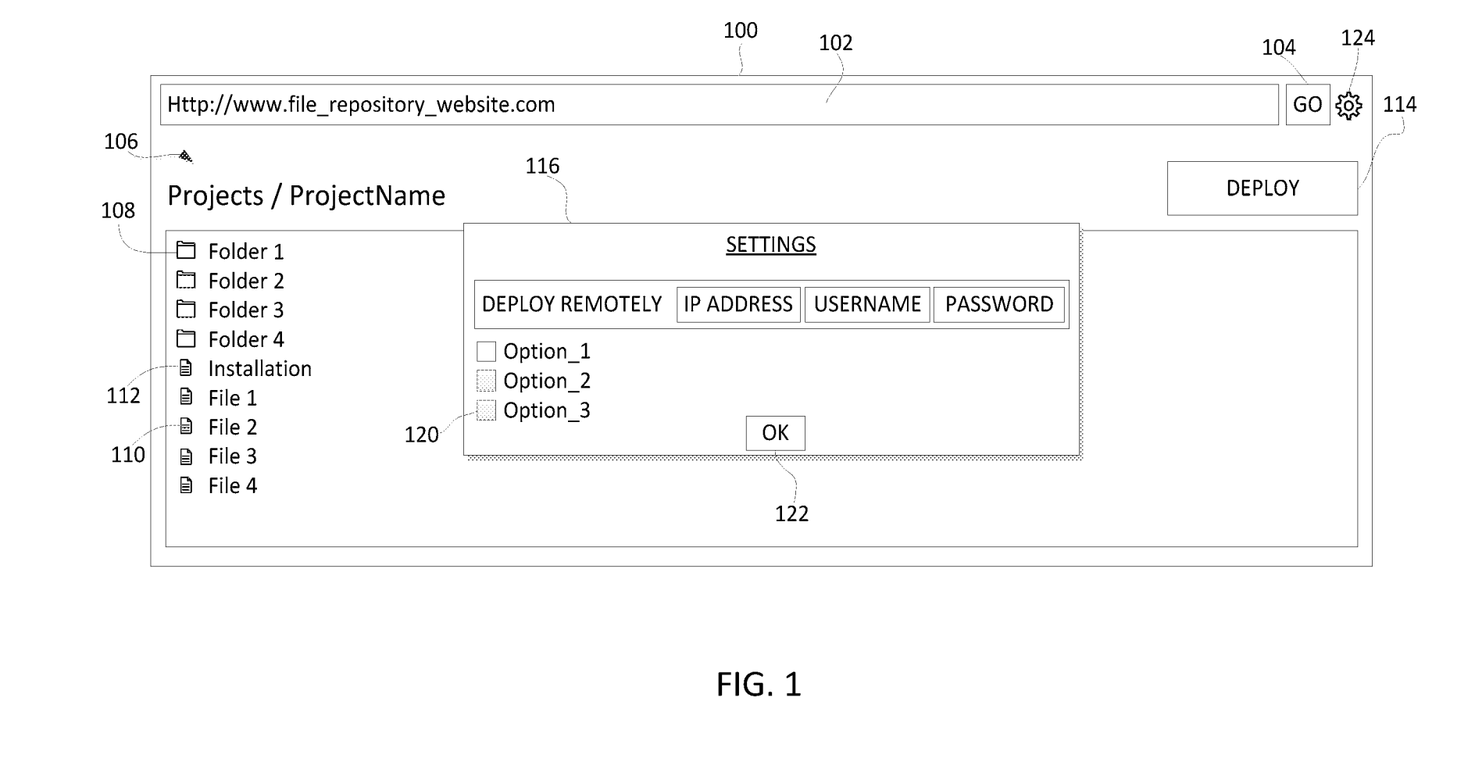
FIG. 1 is a user interface diagram of an example of a website browser with an integrated plugin for deploying software according to some aspects.

FIG. 1 is a user interface diagram of an example of a website browser 100 (e.g., Firefox™, Chrome™, Internet Explorer™, etc.) with an integrated plugin for deploying software according to some aspects. A plugin can include a software module having computer-readable program code (which can also be referred to as "program code") for adding, extending, or otherwise modifying a functional capability of existing software. Plugins can be downloaded from a remote data source or otherwise obtained and integrated with the existing software. In the example shown in FIG. 1, the plugin is a website-browser plugin that is integrated with website browser 100 for providing software-deployment functionality to the website browser 100.

In some examples, the plugin can be customized according to one or more user-configurable parameters. For example, the website browser 100 or the plugin can detect a user interaction with a button 124, a menu item, or another user interface object. In response to the user interaction, the website browser 100 or the plugin can open a window, a dialog box, a command-line terminal, or can otherwise provide an interface 116 through which a user can customize the plugin.

The plugin can receive input, such as a selection of an option 120, indicating a setting or other parameter for configuring or customizing the operation of the plugin 314. For example, the plugin can receive input indicating (i) whether software is to be deployed in a container or a virtual machine; (ii) a configuration of the container or virtual machine, such as how much memory, processing power, or other computing resources is to be devoted to the container or virtual machine; (iii) whether progress information is to be displayed while software is being deployed (e.g., as discussed with respect to FIG. 2); (iv) a software or hardware feature of a computing device on which the software is to be deployed; or any combination of these. The software feature of the computing device can include a software library or other software component installed on the computing device. The hardware feature of the computing device can include a central processing unit (CPU), graphics processing unit (GPU), or memory device installed on the computing device. In some examples, the plugin can receive input indicating whether software is to be deployed on the user's local computing device, such as the computing device executing the website browser 100, or on a remote computing device. If the software is to be deployed on a remote computing device, the plugin can receive information for facilitating the deployment of the software on the remote computing device. For example, the plugin can receive an internet protocol (IP) address for the remote computing device; authentication information (e.g., as username and password) for the remote computing device; information about hardware and software of the remote computing device; encryption details; or other kinds and combinations of information. The plugin can receive any number and combination of input for customizing the plugin. In some examples, the plugin can detect an interaction with an interface component 122, such as a "SAVE" button or "OK" button, and implement the user's customizations.

To begin using the plugin, a user can navigate to a website via the website browser 100. For example, the user can input an address for the website (e.g., a uniform resource locator (URL) for the website) into an address box 102 of the website browser 100 and select a "GO" button 104. The website browser 100 can obtain website code for the website and render the website using the website code. Examples of the website code can include hypertext markup language (HTML) code, java code, JavaScript code, personal home page (PHP) code, or any combination of these. An example of the rendered website is shown in FIG. 1.

The plugin can determine if program code for software (e.g., as distinguished from the website code itself or the program code for the plugin) is hosted (e.g., shared) on the website. In some examples, the plugin can analyze the website code, the website content 106, one or more characteristics of the website itself (e.g., the URL for the website or a title of the website), or any combination of these to determine program code for software is hosted on the website. For example, the plugin can compare a URL for the website to a list of URLs known to be open-source website. If the URL for the website is on the list, the plugin can determine that program code for software is hosted on the website. As another example, the plugin can analyze the website code to determine if the website code includes segments of program code, hyperlinks to program code, or other indicia of program code for a piece of software. In the example shown in FIG. 1, the plugin can analyze the website code and detect a hyperlink to a file 110 that includes program code, a hyperlink to a folder 108 associated with program code, a hyperlink to an installation file 112, or any combination of these indicia of program code. The plugin can additionally or alternatively analyze website content 106 for certain keywords or combinations of keywords to determine if program code for software is hosted on the website. Examples of the keywords can include "project," "program," "code," "software," "application," a name of a programming language (e.g., C++ or Java), etc. If the plugin detects one or more indicia of program code, the plugin can determine that program code for software is hosted on the website. The plugin can use any number and combination of techniques to determine that program code for software is hosted on the website.

In some examples, the plugin can integrate an interface component 114 into the website content 106 based on detecting that program code for software is hosted on the website. The interface component 114 can include a graphical object, such as a button, slider, menu, image, icon, etc. The plugin can integrate the interface component 114 into the website content 106 by including a code segment into the website code. The code segment can cause the website browser 100 to render the website content 106 as including the interface component 114. For example, the plugin can include the HTML segment "<button type='deploy'>DEPLOY</button>" into the website code. This HTML segment can cause the website to include an interface component 114 that is a button having the label "DEPLOY." The interface component 114 or the code segment can include a tag, parameter, label, or other feature for causing the plugin to deploy the software in response to a user interacting with the interface component 114. For example, the above HTML segment includes the parameter "type='deploy'," which can cause the plugin to deploy software in response to the user interacting with the interface component 114.

The plugin can also determine how to deploy the software. For example, the plugin can analyze the user-configurable parameters (and other user input), a file 110 (e.g., a text file, image, archive, zip file, a Dockerfile, Vagrantfile, etc.), a folder 108, an installation file 112, website content 106, or any combination of these to determine particular settings, dependencies, or other information for deploying the software on the user's local computing device or a remote computing device. Additionally or alternatively, the plugin can determine the hardware, software, operating system, or other characteristics of the user's local computing device or the remote computing device (e.g., based on real-time analysis or user input) for determining how to deploy the software on the user's local computing device or the remote computing device. The plugin can also use combinations of information to determine how to deploy the software. For example, the plugin can analyze the installation file 112 (e.g., an "installation" section of the installation file 112, a "configuration" section of the installation file 112, or both) to determine how to deploy the software in view of the software characteristics, hardware characteristics, or both of the user's local computing device or the remote computing device. In some examples, the plugin can access a database to map user input, website content 106, information related to files 110, information related to folders 108, and other data to information for deploying the software. For example, the plugin can use a database to map a programming language in which the program code is written to a library, file, application, or any combination of these usable for deploying the software. In some examples, the plugin can determine a series of steps (which can include obtaining and installing a library, file, or application) for deploying the software on the user's local computing device or the remote computing device.

The plugin can deploy the software on the user's local computing device or a remote computing device based on a user interaction with the interface component 114. For example, the plugin can detect that the user clicked the DEPLOY button shown in FIG. 1. In response, the plugin can perform one or more steps (e.g., determined as discussed above) to deploy the software. In examples in which the plugin is configured to deploy the software on a remote computing device, the plugin can send a command to the remote computing device to cause the remote computing device to deploy the software.

Figure 2:
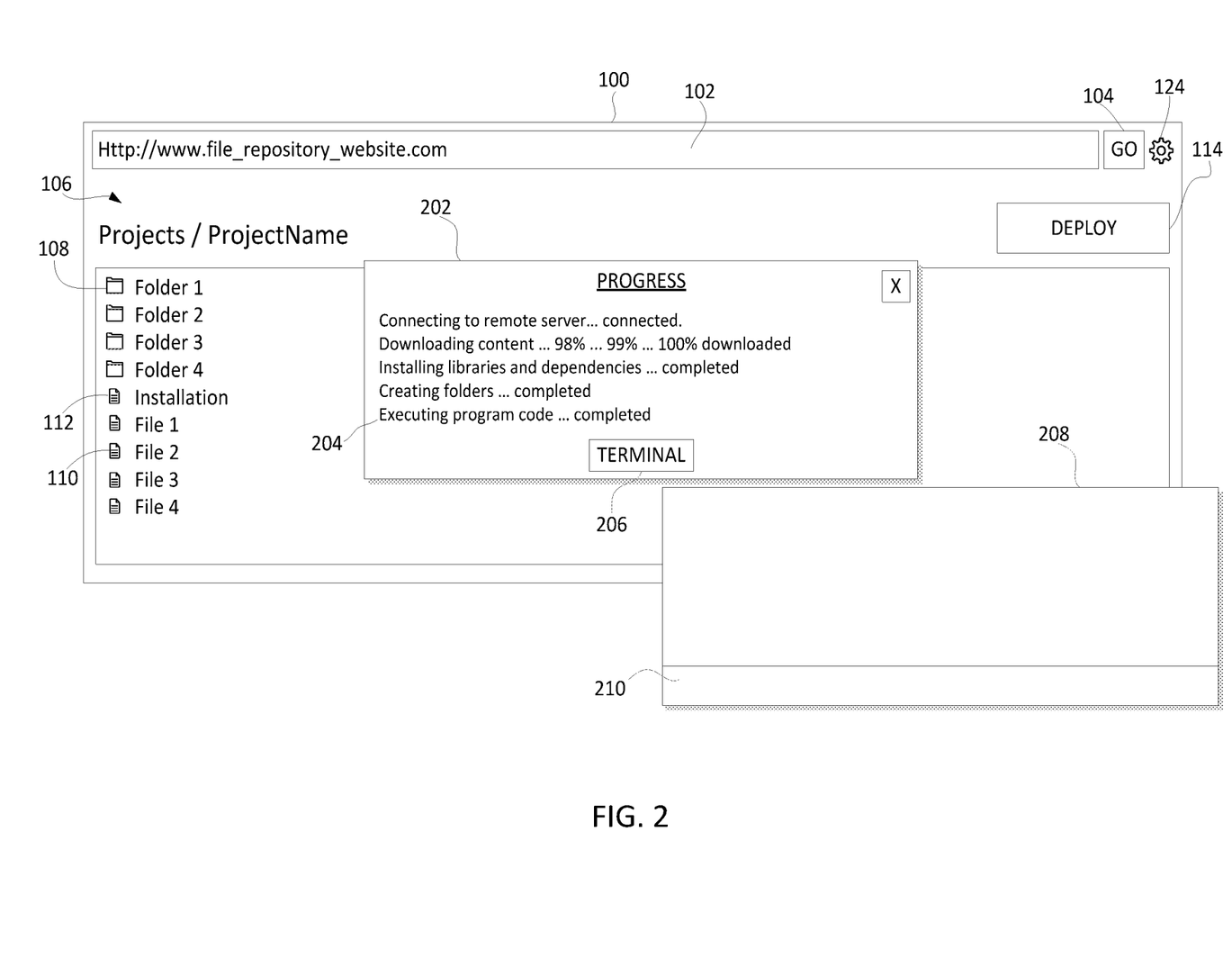
FIG. 2 is a user interface diagram of an example of a progress update related to deploying software according to some aspects.

As shown in FIG. 2, the plugin can also provide progress information 204 (e.g., via a window, command-line terminal, dialog box, or other interface component 202) associated with deploying the software on the user's local computing device or the remote computing device. Examples of the progress information 204 can include a status of a connection with a remote computing device, a status of content being downloaded to the remote computing device, a status of libraries, software, or other data to be installed on the remote computing device, a status of a file or folder to be created on the remote computing device, a status associated with compiling or executing the program code, a status associated with a background process being executed, an overall completion status for deploying the software, or any combination of these. Additionally or alternatively, the plugin can cause a terminal 208 to be opened. For example, the interface component 202 can include a button 206 for opening the terminal 208. The plugin can detect that the button 206 was pressed and, in response, cause the terminal 208 to be opened. The terminal 208 can provide an interface through which the user can interact with the local computing device or the remote computing device to use the deployed software, check that the deployed software was properly installed, or perform other functions. For example, the terminal 208 can receive, via an input box 210, a command for checking the configuration of the deployed software. In response, the terminal 208 can perform the command and display information indicating the configuration of the deployed software.

In some examples, the plugin may determine that more or different information is needed to deploy the software. For example, the plugin may need an encryption key or an application programming interface (API) parameter to deploy the software. The plugin can prompt the user to provide such information. The plugin can use the information provided by the user to complete the deployment of the software.

Although FIG. 1 is described with respect to a plugin that is integrated with the website browser 100, other examples may include other types of software capable of performing any of the functions of the plugin. For example, the website browser 100 itself may be able to perform any of the functions of the plugin, so that a separate plugin is unnecessary. As another example, a software application that is separate from (not integrated with) the website browser 100 can perform the functions of the plugin. In one such example, the software application can be a standalone software application that can analyze website code, website content, or both obtained by the website browser 100 to perform any of the functions of the plugin. Thus, examples of the present disclosure are not limited in implementation to a plugin for a website browser 100.

Figure 3:
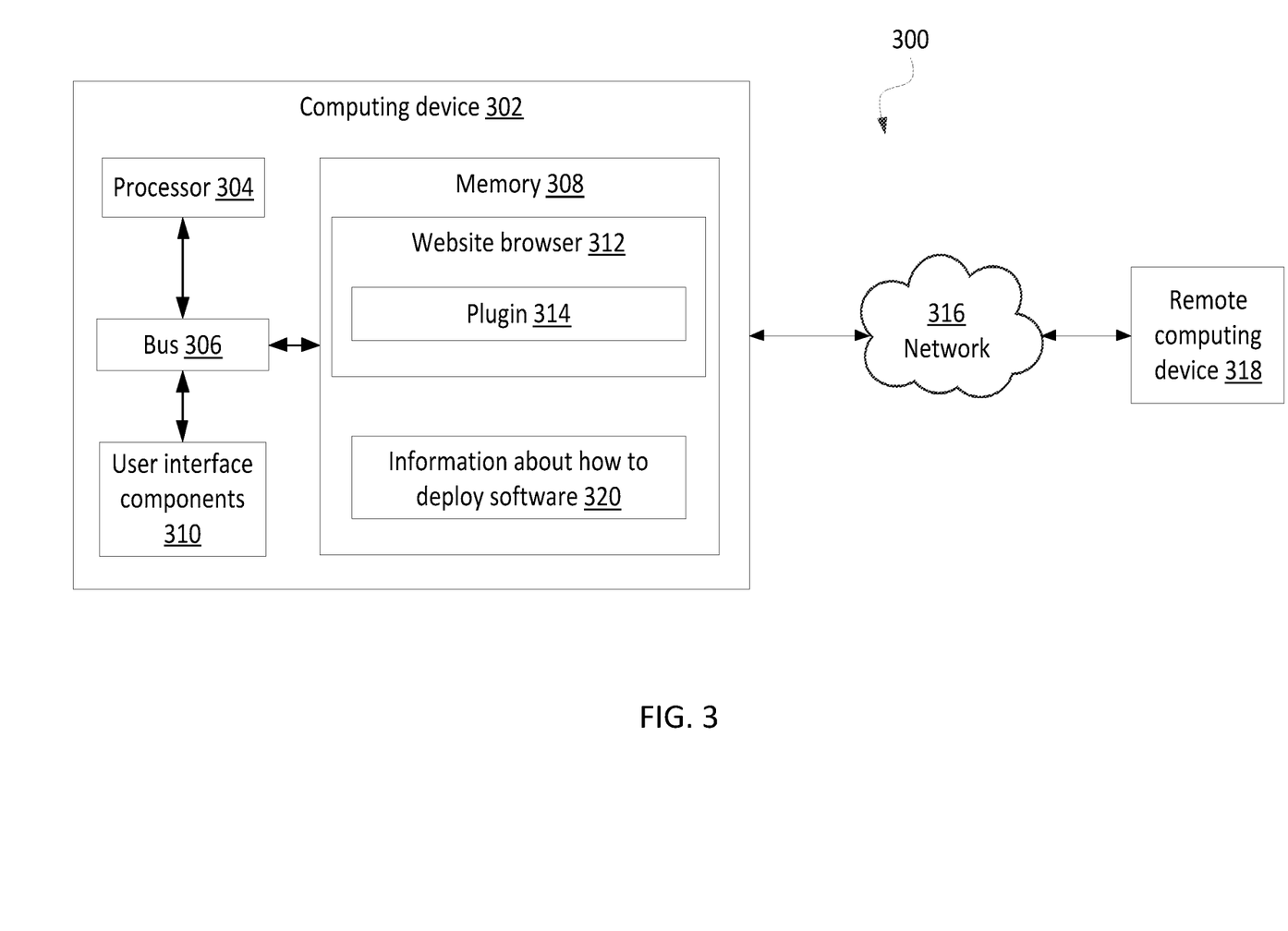
FIG. 3 is a block diagram of an example of a system that includes a plugin for deploying software according to some aspects.

FIG. 3 is a block diagram of an example of a system 300 that includes a plugin for deploying software according to some aspects. The system 300 includes a computing device 302 having a processor 304, a memory 308, and a bus 306. In some examples, the components of the computing device 302 (e.g., the processor 304, the bus 306, the user interface components 310, and the memory 308) can be integrated into a single structure. For example, the components can be within a single housing. In other examples, the components shown in FIG. 3 can be distributed (e.g., in separate housings) and in electrical communication with each other.

The processor 304 can execute one or more operations for implementing any of the features of the present disclosure. The processor 304 can execute instructions stored in the memory 308 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 308 via the bus 306. The non-volatile memory 308 may include any type of memory device that retains stored information when powered off. Non-limiting examples of the memory 308 include electrically erasable and programmable read-only memory ("EEPROM"), flash memory, or any other type of non-volatile memory. In some examples, at least some of the memory 308 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 308 can include program code for a website browser (e.g., the website browser 100 of FIGS. 1-2), which is designated as website browser 312. The memory 308 can additionally or alternatively include program code for a plugin (e.g., the plugin of FIGS. 1-2), which is designated as plugin 314. As discussed above, in some examples, plugin 314 can represent program code for another type of software, such as an add-on, extension, or other software component, which may or may not be integrateable with the website browser, but is capable of performing any of the functions of the plugin. The memory 308 can also include information 320 related to how to deploy the software. The plugin 314 can determine the information 320 by analyzing various factors related to the software, program code for the software, the computing device 302, the remote computing device 318, etc. In some examples, the information 320 can include one or more steps for deploying the software, information usable for deploying the software (e.g., any of the information discussed above with respect to FIG. 1), or both. The memory 308 can include any number and combination of applications, engines, modules, or other program code for enabling one or more features of the present disclosure.

The user interface components 310 can include, or facilitate connection to, one or more user interface devices. Examples of a user interface device can include a display device, touch-sensitive surface, touch-screen display, keyboard, mouse, speaker, microphone, button, or other hardware used to input data or output data. For example, the user interface components 310 can include a keyboard and a mouse for receive user input and a display device for providing output.

The computing device 302 can be in communication with a remote computing device 318 via a network 316, such as a local network or the Internet. The network 316 can include one or more sub-networks. In some examples, the remote computing device 318 can be cloud-based. For example, the remote computing device 318 can include physical or virtual computing resources provided according to one or more service models, such as infrastructure as a service (IaaS) or platform as a service (PaaS). The computing device 302 can communicate with the remote computing device 318 via the network 316 to deploy software on the remote computing device 318. For example, the computing device 302 can transmit commands, files, or other information to the remote computing device 318 for deploying software on the remote computing device 318. In some examples, the computing device 302 can use the information 320 to determine which commands, files, or other information to transmit to the remote computing device 318 for deploying software on the remote computing device 318.

Figure 4:
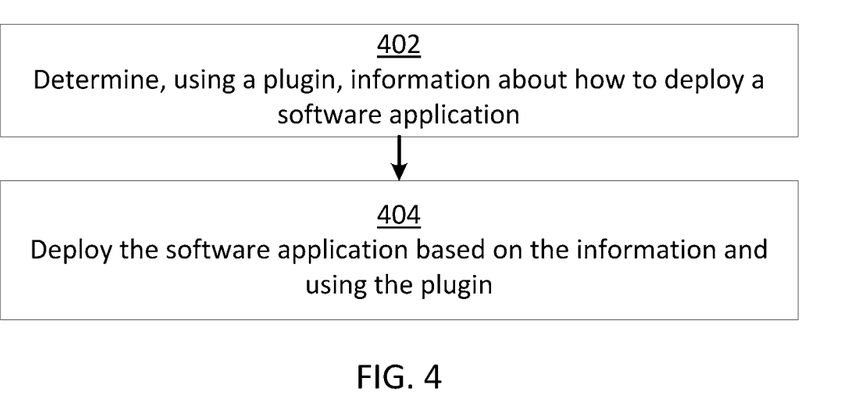
FIG. 4 is a flow chart showing an example of a process for deploying a software application according to some aspects.

FIG. 4 is a flow chart showing an example of a process for deploying software according to some aspects. Some examples can include more, fewer, or different steps than the steps depicted in FIG. 4. Also, some examples can implement the steps of the process in a different order. The steps below are described with reference to components described above with regard to FIG. 3, but other implementations are possible.

In block 402, the plugin 314 determines information about how to deploy the software application on a computing device. An example of the information can include a setting, a configuration, a series of steps, or other data usable for deploying the software. In some examples, the plugin 314 can determine the information using any combination of the methods discussed above with respect to FIGS. 1-3 and the methods discussed below.

The plugin 314 can determine the information about how to deploy the software application by analyzing content of a website that is hosting program code for the software application. For example, the content of the website can include a characteristic of the software application, such as a name of the software application, a version number of the software application, a provider of the software application, etc. The plugin 314 can analyze the content of the website to determine one or more characteristics of the software application. The plugin 314 can then determine the information about how to deploy the software application based on the one or more characteristics of the software application.

As another example, the content of the website can include a file that is hosted on the website. The file may be a readme file, an installation file (e.g., with installation commands or settings), a configuration file (e.g., with configuration commands or settings), or another file. The plugin 314 can extract at least a portion of the data from the file, and use extracted data to determine the information about how to deploy the software application on the computing device. In some examples, the file can include program code for the software application. The plugin 314 can analyze one or more features of the program code (e.g., any combination of the name, length, programming language, syntax, functionality, or vendor of the program code) to determine the information about how to deploy the software application.

In some examples, the plugin 314 can determine the information about how to deploy the software application on the computing device based on the presence of a hyperlink to the file in the website code, the presence of the file itself, or other features (e.g., metadata) associated with the file. For example, the file can be or include a Dockerfile, a Vagrantfile, an image, or another type of archive. The plugin 314 can determine the information based on the presence or content of the Dockerfile, the Vagrantfile, the image, or the other type of archive file. For example, the plugin 314 can determine that the software application is to be deployed in a container based on the presence of the Dockerfile, that the software application is to be deployed in a virtual machine based on the presence of the Vagrantfile, or that the software application is to be compiled using a particular type of compiler based on a type of the archive file, etc.

In some examples, the plugin 314 can determine the information about how to deploy the software application on the computing device based on user-configurable parameters. The plugin 314 can receive the user-configurable parameters and determine how to deploy the software application based on the user-configurable parameters. For example, the user-configurable parameters can include a characteristic of an operating system associated with the remote computing device 318, a characteristic of hardware associated with the remote computing device 318, a characteristic of software associated with the remote computing device 318, or any combination of these. The plugin 314 can determine the information based on any combination of the operating system, hardware, and software characteristics. For example, the plugin 314 can determine one version of the software application is to be deployed on the remote computing device 318 if the remote computing device 318 is running one type of operating system, such as the Windows™ operating system, while another version of the software application is to be deployed on the remote computing device 318 if the remote computing device 318 is running another type of operating system, such as the Linux operating system.

In some examples, the plugin 314 can determine the information about how to deploy the software application by analyzing content of the website in view of the one or more user-configurable parameters. For example, a user-configurable parameter can include an operating system of the computing device 302. The plugin 314 can analyze a readme file hosted on the website to determine a setting or configuration specifically applicable to the operating system. As another example, a user-configurable parameter can include a compiler (e.g., for compiling program code) stored on the computing device 302. The plugin 314 can analyze the program code hosted on the website to determine if the compiler stored on the computing device 302 is able to compile the program code, or if another compiler is needed. As still another example, the user-configurable parameter can include a setting indicating that all software applications are to be deployed in a virtual machine or container executing on a remote computing device. The plugin 314 can analyze the program code to determine if a functional feature of the program code is executable in a virtual machine or container. If not, the plugin 314 may notify the user, prevent deployment of the software application, or perform some other operation.

The plugin 314 may receive user-configurable parameters at different times during operation of the plugin 314. For example, the plugin 314 can prompt the user to provide a user-configurable parameter immediately after being integrated with a website browser 312. The plugin 314 can additionally or alternatively prompt the user to provide a user-configurable parameter in response to the user navigating to a website using the website browser 312. The plugin 314 can additionally or alternatively prompt the user to provide a user-configurable parameter after initiating or completing deployment of software associated with the website (e.g., while the software is being deployed).

In some examples, the plugin 314 can use a database to map any of the above-mentioned data (obtained by analyzing the content of the website) to the information about how to deploy the software application. For example, the plugin 314 can map a name of the software application to a command for deploying the software. The command for deploying the software can be the information about how to deploy the software application on the computing device. As another example, the plugin 314 can map the presence of a particular file or file type, such as a Dockerfile, to a particular setting for the software application—e.g., that the software application is to be deployed in a container. The particular setting for the software application can be the information about how to deploy the software application on the computing device. The plugin 314 can use any number and combination of techniques for determining the information about how to deploy the software application on the computing device.

In block 404, the plugin 314 deploys the software application (on the local computing device 302, the remote computing device 318, or both) using the information about how to deploy the software application. The plugin 314 can additionally or alternatively use program code for the software application, a user-configurable parameter, or both to deploy the software application.

In some examples, the plugin 314 can cause the local computing device 302 or the remote computing device 318 to obtain (e.g., download) multiple files from a website. The files can be usable for deploying the software application. The plugin 314 can cause program code from at least one file of the multiple files to be compiled into an executable file. The plugin 314 can cause the executable file to be executed to deploy the software application.

In some examples, the plugin 314 can cause the software application to be deployed externally to, and independent of, the website browser 312. For example, the plugin 314 can cause the software application to be deployed as a standalone program from the website browser 312.

In one example, the plugin 314 can connect to the remote computing device 318 using a user-configurable parameter that includes an IP address for the remote computing device 318. The plugin 314 can then authenticate with the remote computing device 318 using a user-configurable parameter that includes authentication information for the remote computing device 318. Prior to or after authenticating with the remote computing device 318, the plugin 314 can determine a command for deploying the software application on the remote computing device 318 based on the information about how to deploy the software application. For example, the plugin 314 can determine command for causing the remote computing device 318 to obtain, install, configure, compile, and/or execute one or more files, folders, or other content for deploying the software application on the remote computing device 318. As a particular example, the plugin 314 can determine a command for causing the remote computing device 318 to download and execute the program code for the software application. The plugin 314 can then transmit the command to the remote computing device 318 to deploy the software application on the remote computing device 318.

In some examples, the plugin 314 can determine that the software application is to be deployed in a virtual machine on the remote computing device 318. In such an example, the plugin 314 may analyze a Vagrantfile to determine information about how to provision the virtual machine. The Vagrantfile can include an operating system for the virtual machine, a platform (e.g., libvirt, OpenStack, etc.) for the virtual machine, a virtual resource for the virtual machine, a setting for the virtual machine, and other information for configuring the virtual machine. If a Vagrantfile is unavailable, the plugin 314 can prompt the user to provide information about how to provision the virtual machine or determine the information based on one or more user-configurable parameters. The plugin 314 can cause the virtual machine to be provisioned on the remote computing device 318 (e.g., based on the information about how to provision the virtual machine) and the software to be deployed in the virtual machine.

In some examples, the plugin 314 can determine that the software application is to be deployed in a container on the remote computing device 318. In such an example, the plugin 314 may analyze a Dockerfile to determine information about how to provision the container. The Dockerfile can include a particular Docker image to obtain for deploying the software application, a setting for the container, one or more commands for provisioning the container, etc. If the Dockerfile is unavailable, the plugin 314 can prompt the user to provide the information about how to provision the container or determine the information based on one or more user-configurable parameters. The plugin 314 can cause the container to be provisioned on the remote computing device 318 (e.g., based on the information about how to provision the container) and the software to be deployed in the container. For example, the plugin 314 can cause the remote computing device 318 to obtain, install, configure, and execute the Docker image specified in the Dockerfile to deploy the software application in the container. As a particular example, the plugin 314 can determine that from the Dockerfile that a JDK8.1 image is to be used for deploying the software application in the container. The plugin 314 can then cause the remote computing device 318 to obtain the JDK8.1 image, install the programs zip and curl, create a group and a user on the container, download files to the container, and execute the files to run the software application.

Figure 5:
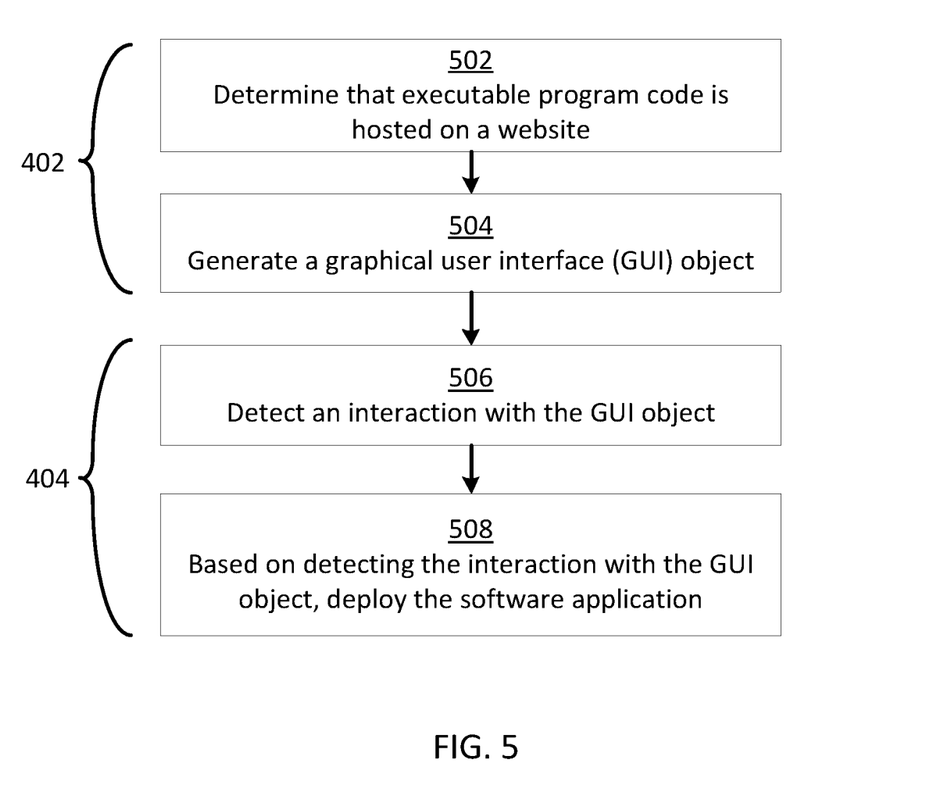
FIG. 5 is a flow chart showing an example of a process for generating a graphical user interface object usable for deploying a software application according to some aspects.

FIG. 5 is a flow chart showing an example of a process for generating a graphical user interface object usable for deploying a software application according to some aspects. Some examples can include more, fewer, or different steps than the steps depicted in FIG. 5. Also, some examples can implement the steps of the process in a different order. The steps below are described with reference to components described above with regard to FIG. 3, but other implementations are possible.

In block 502, the plugin 314 determines that executable program code is hosted on a website. The plugin 314 can determine that the executable program code is hosted on the website based on the website browser 312 navigating to the website. The executable program code can be for software that is deployable externally to the website browser 312. For example, the software can be deployed as a standalone application that is separate from the website browser 312.

The plugin 314 can determine that the executable program code is hosted on the website by analyzing the website code (e.g., the HTML or other program code for the website), the website's content, a file associated with the website, a characteristic of the website, or any combination of these. For example, the plugin 314 can determine that the executable program code is hosted on the website by analyzing the website code or the website's content for one or more keywords indicative of program code for software. Additionally or alternatively, the plugin 314 can determine that the executable program code is hosted on the website by analyzing a readme file, an installation file, a file that includes program code, or another folder or file that is hyperlinked to or otherwise referenced in the website code. Additionally or alternatively, the plugin 314 can determine that the executable program code is hosted on the website by analyzing a characteristic of a website, such as a URL for the website, a title of the website, a company associated with the website, or any combination of these.

In block 504, the plugin 314 generates a graphical user interface (GUI) object (or another interface component). The plugin 314 can generate the GUI object based on determining that the executable program code is hosted on the website. In some examples, the plugin 314 can generate the GUI object by inserting a code segment into the website code. For example, the plugin can insert HTML code into the website code for generating any suitable GUI object, such as a button, icon, image, or menu, in the website's content. The GUI object can be manipulated by a user to cause the plugin 314 to deploy the software application.

The plugin 314 can additionally or alternatively generate the GUI object in another manner. For example, because the plugin 314 can be integrated with the website browser 312, the plugin 314 may have access to a GUI feature of the website browser 312. In such an example, the plugin 314 may be able to generate the GUI object within a menu, tab, window, dialog box, or another GUI feature of the website browser 312, without inserting the code segment into the website code.

In block 506, the plugin 314 detects an interaction with the GUI object. For example, the plugin 314 can repeatedly execute a main loop or another function for detecting an event, such as a mouse click, key press, button press, or an interaction with a touch-sensitive surface. The main loop or other function can trigger a callback in response to the event. For example, the plugin 314 can repeatedly execute a function for detecting a user interaction with the GUI object and trigger a callback in response to the user interaction.

In block 508, the plugin 314 deploys the software application based on detecting the interaction with the GUI object. For example, in response to detecting the interaction with the GUI object, the plugin 314 can deploy the software application using any of the methods discussed with respect to block 404 of FIG. 4.

Although the above steps of FIGS. 4-5 have been described as being performed by the plugin 314, in other examples the above steps can be performed by the processor 304 or by other software executing on the computing device 302. Also, any of the steps shown in FIGS. 4-5 can be combined or otherwise used together.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium comprising instructions for a plugin usable with a website browser, the plugin being executable by a processing device for causing the processing device to:
   determine that program code for a software application is downloadable from a website;
   in response to determining that the program code for the software application is downloadable from the website, integrate a graphical user interface (GUI) object into content of the website by inserting a code segment into website code for the website, the GUI object being manipulatable for causing the software application to be deployed on a computing device;
   analyze the content of the website to determine a series of steps configured to be executed in a particular order for deploying the software application on the computing device, the series of steps describing how to deploy the software application on the computing device after the program code for the software application is downloaded to the computing device;
   detect a manipulation of the GUI object; and
   in response to detecting the manipulation of the GUI object:
      cause the program code for the software application to be downloaded to the computing device; and
      subsequent to the program code for the software application being downloaded to the computing device, deploy the software application on the computing device by causing the computing device to execute the series of steps in the particular order.

2. The non-transitory computer-readable medium of claim 1, wherein the content of the website is a file that is downloadable from the website independently of a webpage of the website displayed in the website browser.

3. The non-transitory computer-readable medium of claim 2, wherein the plugin is further executable by the processing device for causing the processing device to determine the series of steps at least in part by analyzing the program code for the software application.

4. The non-transitory computer-readable medium of claim 2, wherein the plugin is further executable by the processing device for causing the processing device to:
   determine a hardware characteristic and a software characteristic of the computing device; and
   determine the series of steps for deploying the software application on the computing device based on the hardware characteristic and the software characteristic of the computing device.

5. The non-transitory computer-readable medium of claim 1, wherein the plugin is further executable by the processing device for causing the processing device to:
   determine that the program code for the software application is downloadable from the website based on the content of the website.

6. The non-transitory computer-readable medium of claim 1, wherein the plugin is further executable by the processing device for causing the processing device to:
   determine that the program code for the software application is downloadable from the website based on a uniform resource locator (URL) address associated with the website, a title associated with the website, a keyword within the content of the website, or a hyperlink within the content of the website.

7. The non-transitory computer-readable medium of claim 1, wherein the plugin is further executable by the processing device for causing the processing device to:

receive a user-configurable parameter for customizing how the software application is to be deployed on the computing device; and deploy the software application on the computing device using the program code for the software application, the series of steps, and the user-configurable parameter.

8. The non-transitory computer-readable medium of claim 1, wherein the website comprises a plurality of hyperlinks to a plurality of files for deploying the software application, and wherein the plugin is further executable by the processing device for deploying the software application on the computing device by:

causing the plurality of files to be downloaded to the computing device;

causing program code from at least one file of the plurality of files to be compiled into an executable file on the computing device; and causing the executable file to be executed on the computing device.

9. The non-transitory computer-readable medium of claim 1, wherein the plugin is configured to be integrated into the website browser, and wherein the series of steps describe how to configure the software application on the computing device subsequent to the program code for the software application being downloaded to the computing device.

10. A system comprising:

a processing device; and a memory device comprising instructions for a plugin usable with a website browser, the plugin being executable by the processing device for causing the processing device to:

determine that program code for a software application is downloadable from a website;

in response to determining that the program code for the software application is downloadable from the website, integrate a graphical user interface (GUI) object into content of the website by inserting a code segment into website code for the website, the GUI object being manipulatable for causing the software application to be deployed on a computing device;

analyze the content of the website to determine a series of steps to be executed in a particular order for deploying the software application on the computing device, the series of steps describing how to deploy the software application on the computing device after the program code for the software application is downloaded to the computing device;

detect a manipulation of the GUI object; and in response to detecting the manipulation of the GUI object:

cause the program code for the software application to be downloaded to the computing device; and subsequent to the program code for the software application being downloaded to the computing device, deploy the software application on the computing device by causing the computing device to execute the series of steps in the particular order.

11. The system of claim 10, wherein the plugin is configured to be integrated with the website browser for providing an additional functional capability to the website browser, and wherein analyzing the content of the website comprises:

analyzing an installation file or a configuration file provided with the program code and hosted on the website to determine the series of steps.

12. The system of claim 10, wherein the plugin is further executable for causing the processing device to:

in response to navigating to the website using the website browser, analyze one or more characteristics of the website to determine that the program code for the software application is hosted on the website.

13. The system of claim 12, wherein the plugin is further executable for causing the processing device to determine that the program code for the software application is downloadable from the website based on a uniform resource locator (URL) address for the website, a title for the website, a keyword within the content of the website, the program code being within the content of the website, a hyperlink to a particular file being within the content of the website, or an attribute of the particular file.

14. The system of claim 10, wherein the computing device is a remote computing device, and the plugin is further executable for causing the processing device to:

deploy the software application in a virtual machine or a container on the remote computing device by transmitting commands to the remote computing device over the Internet, the commands configured to cause the remote computing device to generate the virtual machine or the container and deploy the software application within the virtual machine or the container; and cause a command terminal to be displayed by a display device, the command terminal being configured to receive input for manipulating the remote computing device.

15. A computer-implemented method comprising:

determining, using a plugin for a website browser, that program code for a software application is downloadable from a website;

in response to determining that the program code for the software application is downloadable from the website, integrating, using the plugin, a graphical user interface (GUI) object into content of the website by inserting a code segment into website code for the website, the GUI object being manipulatable for causing the software application to be deployed on a computing device;

analyzing, using the plugin, the content of the website to determine a series of steps configured to be executed in a particular order for deploying the software application on the computing device, the series of steps describing how to deploy the software application on the computing device after the program code for the software application is downloaded to the computing device;

detecting, using the plugin, a manipulation of the GUI object; and in response to detecting the manipulation of the GUI object:

causing, by the plugin, the program code for the software application to be downloaded to the computing device; and subsequent to the program code for the software application being downloaded to the computing device, deploying, using the plugin, the software application on the computing device by causing the computing device to execute the series of steps in the particular order.

16. The method of claim 15, further comprising:

receiving a user-configurable parameter for customizing how the software application is deployed; and deploying the software application on the computing device using the program code, the series of steps in the particular order, and the user-configurable parameter.

17. The method of claim 15, further comprising:
detecting, by the plugin, that the program code for the software application is hosted on the website by analyzing one or more characteristics of the website in response to navigating to the website using the website browser.

18. The non-transitory computer-readable medium of claim 1, wherein the program code is source code for the software application.

19. The non-transitory computer-readable medium of claim 1, wherein the content of the website is written instructions displayed in the website browser as part of a webpage of the website.

20. The non-transitory computer-readable medium of claim 19, wherein the plugin is software configured to be integrated into the website browser on a particular computing device.

* * * * *